United States Patent [19]

McLaughlin et al.

[11] 3,925,749
[45] Dec. 9, 1975

[54] ASYNTHRONOUS PULSE TELEMETRY SYSTEM AND METHOD

[75] Inventors: Charles R. McLaughlin; Jerry B. West, both of Dallas, Tex.

[73] Assignee: The Western Company of North America, Forth Worth, Tex.

[22] Filed: Sept. 24, 1973

[21] Appl. No.: 400,174

[52] U.S. Cl. ............ 340/18 P; 179/15.55; 325/163; 328/41; 250/261; 250/263; 340/18 R; 340/206
[51] Int. Cl. .............................................. G01v 1/40
[58] Field of Search ............... G08C/19/22; 340/18 P, 18 FM, 340/359, 206; 328/39, 41, 136, 140; 325/142, 163; 321/61; 250/261, 262, 263, 267, 392; 179/15.55

[56] References Cited
UNITED STATES PATENTS

| | | | |
|---|---|---|---|
| 3,435,224 | 3/1969 | Zemanek, Jr. | 340/18 P |
| 3,451,012 | 6/1969 | Spiro | 325/163 |
| 3,541,264 | 11/1970 | Boothroyd | 179/15.55 R |
| 3,559,163 | 1/1971 | Schwartz | 340/18 P |
| 3,713,017 | 1/1973 | Vena | 325/163 |
| 3,720,910 | 3/1973 | McLaughlin et al. | 340/18 P |

*Primary Examiner*—Maynard R. Wilbur
*Assistant Examiner*—H. A. Birmiel
*Attorney, Agent, or Firm*—Richards, Harris & Medlock

[57] ABSTRACT

The specification discloses a technique for transmitting randomized pulses generated by a downhole well logging device through a cable to an uphole station. Circuitry is provided within the logging device to receive the randomized pulses. A clock generates a clock signal having a periodic clock frequency. A gate is connected to the output of the clock for selectively gating the clock signal. Circuitry is responsive to the reception of the randomized pulses for operating the gate for a prescribed interval to delete predetermined portions of the clock signal. The output of the gate is divided to generate a series of pulses having periods representative of the reception of the randomized pulses. The series of pulses is transmitted through the cable to the uphole station. Circuitry located at the uphole station utilizes phase lock loop circuitry to reconstruct representations of the randomized pulses in response to the series of pulses.

16 Claims, 5 Drawing Figures

ASYNTHRONOUS PULSE TELEMETRY SYSTEM AND METHOD

FIELD OF THE INVENTION

This invention relates to telemetry of pulses, and more particularly relates to a system and method of telemetering asynchronous or randomized pulses over transmission lines wherein the pulses are subjected to large amplitude degradation and undetermined phase shift characteristics.

THE PRIOR ART

Various types of well logging operations are commonly practiced wherein a logging tool is lowered down a borehole and electrical signals generated by the logging tool are telemetered uphole via a logging cable to a recording apparatus. For example, radiation sensitive detectors such as gamma ray or neutron detectors, generate asynchronous or randomized pulses which must be telemetered through a logging cable. Prior systems have been developed for compressing the bandwidth of such pulses in order to enable high resolution telemetry over the limited bandwidth cables. However, when such logging tools are utilized with transmission cables of substantial length, such as over 4,000 feet in the case of logging cables, the large amplitude degradation and substantial phase shift introduced by the transmission lines render previously developed systems inadequate. A need has thus arisen for a telemetry system for well logging cables and for other relatively long transmission lines, wherein asynchronous pulses may be transmitted without smearing and loss of resolution due to variable phase shifts and substantial amplitude degradation because of the R-C attenuation characteritics of the lines.

The most common type of pulse transmission is to have a line driver actually drive the transmission line with the detected pulses. Problems exist with this type of transmission system in that actual pulses appear on the line. The random high count associated with nuclear events appear too close together on the line to be discriminated at the end of the cable as individual pulses. The name associated with this problem is termed "pulse pile-up."

SUMMARY OF THE INVENTION

In accordance with the present invention, a pulse telemetry technique is provided which essentially eliminates or reduces the problems and inadequacies of prior art pulse telemetry systems. The present pulse telemetry system enables the transmission of a relatively high rate of asynchronous pulses over extremely long transmission lines wherein an undetermined phase shift may be introduced into the pulses.

In accordance with a more specific aspect of the present invention, a system for pulse transmission includes circuitry for generating a periodic output waveform having a first frequency. Circuitry receives asynchronous input pulses and in response thereto, varies the frequency of the output waveform for a predetermined time. The phase modulated output waveform is then transmitted over the transmission line and representation of the asynchronous input pulses are reconstructed at a remote location in response to the phase modulated output waveform.

In accordance with a further aspect of the invention, a system for pulse transmission includes circuitry for receiving asynchronous input pulses. A clock generates a periodic wave train having a first frequency. A gate is provided to gate the wave train in response to the input pulses for deleting portions of the wave train to lower the frequency of portions of the wave train to a second frequency. The wave train is then transmitted to a remote location, whereupon circuitry reconstructs representations of the input pulses in response to the first and second frequencies contained in the wave train.

In accordance with yet another aspect of the invention, a system is provided for transmitting randomized pulses from a downhole well logging device through a cable to an uphole station. Circuitry is positioned downhole for receiving the randomized pulses. A clock generates a clock signal having a fixed first frequency. A gate is connected to the output of the clock for selectively gating the clock signal. Circuitry is responsive to the reception of one of the randomized pulses for operating the gate for a prescribed interval to prevent the passage of a predetermined portion of the clock signal. A divider circuit divides the output of the gate to generate a series of pulses having periods representative of the reception of the randomized pulses. The series of pulses are transmitted through the cable and circuitry located uphole reconstructs representations of the randomized pulses in response to the series of pulses.

In accordance with yet another aspect of the invention, a system for transmitting randomized pulses includes circuitry for receiving the randomized pulses. A clock generates a periodic pulse train having a first frequency. Circuitry is responsive to the reception of one of the randomized pulses for extending the period of one cycle of the pulse train. The extended cycle is out of phase with the remainder of the pulse train by a predetermined magnitude. The pulse train is transmitted to a remote location, wherein circuitry detects the extended cycle within the pulse train. The pulse train is then multiplied by a magnitude sufficient that the extended cycle is out of phase with the remainder of the pulse train by 360°. Circuitry then generates representations of the randomized pulses in response to the output of the multiplier.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
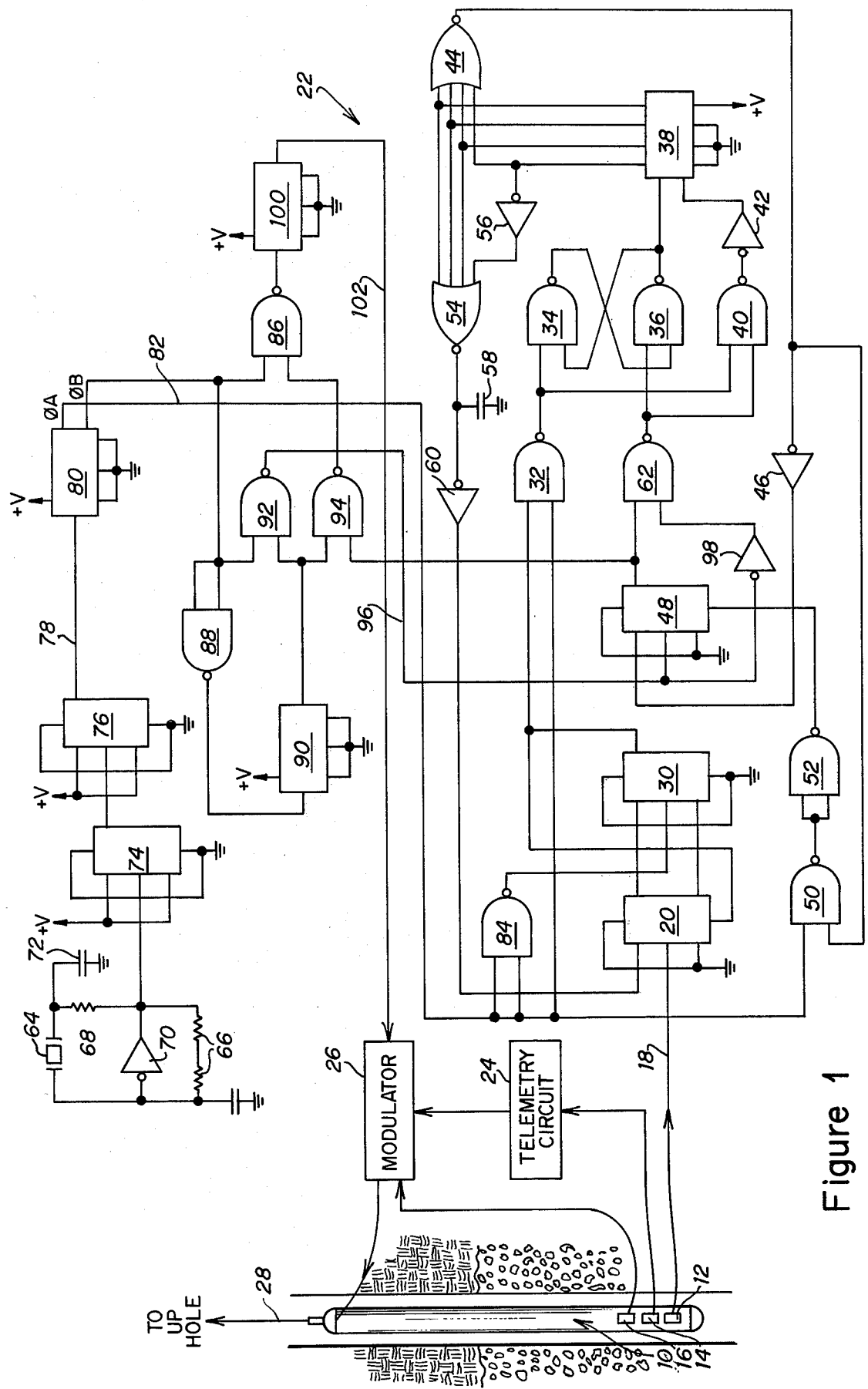
FIG. 1 is a schematic diagram of the downhole transmission system of the invention.

Referring to FIG. 1, a conventional downhole radioactivity logging tool 10 includes a Geiger counter or scintillation counter 12 which generates randomized or asynchronous output pulses. It will of course be understood that the counter 12 could comprise any suitable source of randomized output signals or synchronous pulses. The logging tool 10 also includes a second radioactivity counter 14 and a resistivity detector 16. The counter may comprise for example a gross gamma ray scintillator, while the counter 14 may comprise a gamma ray density detection circuit.

The counter 12 generates asynchronous or randomized pulses via the lead 18 to a flipflop multivibrator 20, which is a portion of the first channel telemetry circuitry 22 shown in schematic detail in FIG. 1. The output of the counter 14 is applied to a second channel telemetry circuit 24 which is identical to circuit 22, except for the frequencies involved. The output of both the telemetry circuits 22 and 24 are applied through a modulator circuit 26 and to the logging cable 28 for transmission to the uphole detection circuitry. The output of the resistivity detector 16 is applied through the modulator 26 to the logging cable 28.

Flipflop 20 is interconnected with a flipflop 30 to form an asynchronous-to-synchronous pulse converter. Asynchronous pulses arrive via the input line 18. This causes the output of flipflop 20 to change status. The next synchronous $\phi$A clock pulse from 80 arrives at the clock input of 30 via invertor 84 and clocks flipflop 30 true. The true output of 30 is applied to gate 32 and the reset line of flipflop 20 resetting it. The next $\phi$A clock received from 80 is applied to an input line of gate 32 and to the clock line of 30 via invertor 84. The output of gate 32 is connected to NAND gate 34 which is interconnected in a latched configuration with a NAND gate 36. The output of NAND gate 36 is connected to the up/down terminal of a divide-by-sixteen up/down counter 38. For example, counter 38 may comprise a CD4029 counter. Inputs of gates 34 and 36 are tied to the input of a NAND gate 40, the output of which is connected through an invertor 42 to the CL terminal of the counter 38. The outputs of the counter 38 are connected to the inputs of a four input NOR gate 44. The output of gate 44 is applied through an invertor 46 to a flipflop 48. The output of gate 44 is also applied to an input of a NAND gate 50, the output of which is applied through a NAND gate 52 to the flipflop 48.

Three of the inputs of gate 44 are connected to a four input NOR gate 54. The fourth input to gate 44 is applied through an invertor 56 to the fourth input of gate 54. The output of gate 54 is connected through a capacitor 58 to circuit ground and also through an invertor 60 to the flipflop 20. The flipflop 48 is connected through a NAND gate 62 to an input of the gate 36.

A crystal 64 is interconnected with resistors 66 and 68, invertor 70 and capacitor 72 to comprise an oscillator for generating a fixed frequency. The resulting oscillator signal is applied through flipflops 74 and 76 to generate a two megahertz periodic signal via lead 78 which is applied to a divide-by-ten divider 80. For example, the divider 80 may comprise a CD4017 divider. The outputs of the divider 80 comprise $\phi$A and $\phi$B signals, each of which are 180° out of phase with one another and have a frequency of 200Khz. The $\phi$A signal is applied via lead 82 through inputs of gate 32 and 50 and also to the inputs of a NAND gate 84. The output of gate 84 is applied to the flipflop 30. The $\phi$B signal is applied directly to an input of a NAND gate 86 and also to the inputs of NAND gates 88 and 92.

The output of gate 88 is applied to a divide-by-ten divider 90 which also may comprise a CD4017. The output of the divider 90 is applied to inputs of NAND gates 92 and 94. The $\phi$B signal is also applied to an input of gate 92 and the output of gate 92 is applied via lead 96 to the flipflop 48 and also via an invertor 98 to an input of gate 62. The output of gate 94 is applied to an input of gate 86. The output of gate 86 is applied through a divide-by-ten divider 100, the output of which is applied via a lead 102 to the modulator 26.

Figure 2:
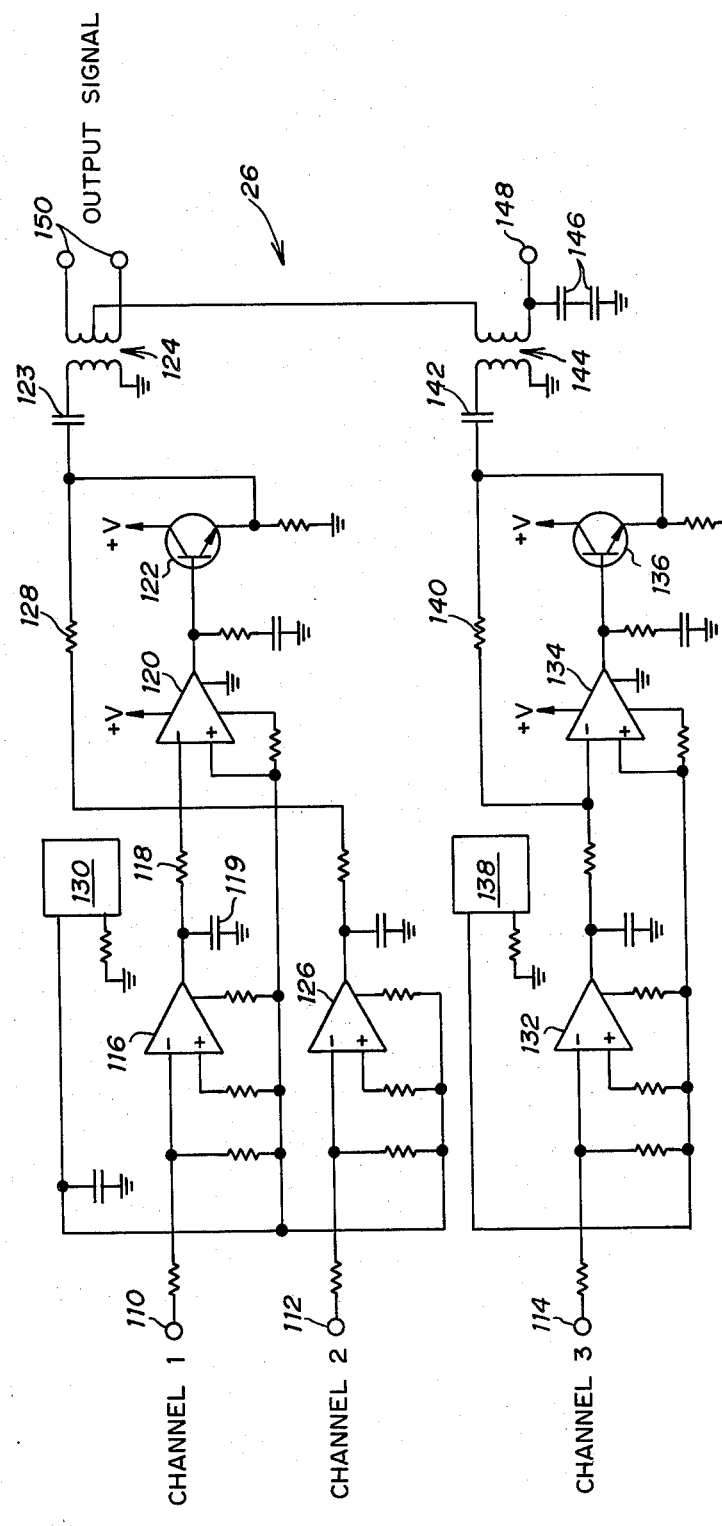
FIG. 2 is a schematic diagram of the modulator circuit of the invention.

FIG. 2 illustrates in schematic detail the circuitry of the modulator 26. Channel 1 includes a terminal 110 for receiving a pulse wave train via lead 102 from the telemetry circuit 22 shown in FIG. 1. Channel 2 includes a terminal 112 for receiving a pulse wave train from the telemetry circuit 24 shown in FIG. 1. Channel 3 includes a terminal 114 for receiving the output of the resistivity detector 16. Terminal 110 is connected via a resistor to the negative input of a transconductance amplifier 116, which may comprise for example a CA3060 amplifier manufactured and sold by RCA Corporation. The property of the amplifier 116 is that its output current is proportional to the input voltage. Capacitor 119 is used to integrate the current from amplifier 116. The input square wave is thus converted to a triangle waveform with this technique. The output of amplifier 116 is applied through a resistance 118 to a negative input of a second transconductance amplifier 120. The output of amplifier 120 is applied to the base of a transistor 122 connected in an emitter follower configuration. The emitter of transistor 122 is connected through a capacitor 123 to the input windings of a line transformer 124.

The terminal 112 is connected to the negative input of a transconductance amplifier 126, the output of which is applied through a resistor 128 to transformer 124. A voltage regulator 130 is connected supply bias voltage to each of the amplifiers 116, 120 and 126.

Terminal 114 is connected to the negative input of a transconductance amplifier 123, the output of which is applied through a transconductance amplifier 134 to the base of an emitter follower transistor 136. The voltage regulator 138 provides bias voltage to the amplifiers 132 and 134. The output of amplifier 132 is connected through a resistance 140 and through a capacitor 142 to the input winding of a line transformer 144. The emitter of transistor 136 is also connected through the capacitor 142 to the transformer 144. The output winding of the transformer 144 is connected through a capacitance 146 to the cable sheath which serves as circuit ground. An input terminal 148 is used for transmission of a variable DC potential uphole which is representative of the self potential as measured at the probe nose. A terminal of the output of the transformer 144 is also connected to a center tap of the output of the transformer 124. A waveform having frequency components of the addition of the frequencies of Channel 1 and Channel 2 is output via terminals 150. This signal is applied through the logging cable to the uphole station for demodulation and detection, as will be subsequently described. A second triangular waveform having a 33.333Khz frequency is input at terminal 112.

In operation of the circuitry shown in FIG. 1, the clock circuitry including the crystal 64 toggles the flipflops 74 and 76 to generate on lead 78 a periodic clock frequency of two megahertz. The divider 80 divides the frequency by ten to generate the $\phi$A and $\phi$B signals which are 180° out of phase and have a 200Khz frequency. When no asynchronous pulses are being applied to the circuitry via lead 18 from the counter 12, the $\phi$B signal is applied through the NAND gate 86 and through the divide-by-ten divider 100 to the modulator 26. The wave train applied from the divider 100 to the modulator 26 comprises a square wave train of 20Khz.

The wave train is converted by the modulator 26 to comprise a triangular wave train which is transmitted through the logging cable 28 to the uphole station.

When an asynchronous pulse is input via lead 18 into the flipflop 20, the flipflop 20 is set. The next 200Khz $\phi$A clock pulse is applied via lead 82 through gate 84 to clock the flipflop 30 true. This resets the flipflop 20 in order to receive another asynchronous input pulse via the lead 18. One clock pulse later, a $\phi$A pulse is entered through gate 32 into gate 34. Gate 36 is thus operated to clock the up/down counter 38 down one count. The four outputs of the counter 38 are thus no longer all zero, and so the output of gate 44 will go false. This false logic state is applied through the invertor 46 to the J gate of the flipflop 48 to set the gate true.

$\phi$B pulses are applied through the gate 88 to the divide-by-ten divider 90, such that a 20Khz square wave train is applied to an input of gates 92 and 94. This wave train is one qualifying function of the gate 92, while the $\phi$B wave train applied from the output of the divider 80 is the second qualifying function. The resulting output of gate 92 is then applied to the flipflop 48 in order to clock the flipflop 48 true. This results in a qualifying function being generated from the flipflop 48 to an input of gate 94. The remaining qualifying function of gate 94 is the output of the divider 90 and thus the output of gate 94 goes false every time that the output of the divider 90 goes true. This occurs at a 20Khz rate for one clock. Gate 94 thus generates a false logic level which is applied to the primary gate 86 in order to delete one pulse out of each ten pulses of the 200Hkz $\phi$B clock applied to gate 86. The resulting gated signals having an effective frequency of 180Khz are applied from the gate 86 to the divide-by-ten divider 100, such that a square wave having an 18Khz period is generated by the divider 100 upon each occurrence of an asynchronous pulse upon lead 18.

Figure 3:
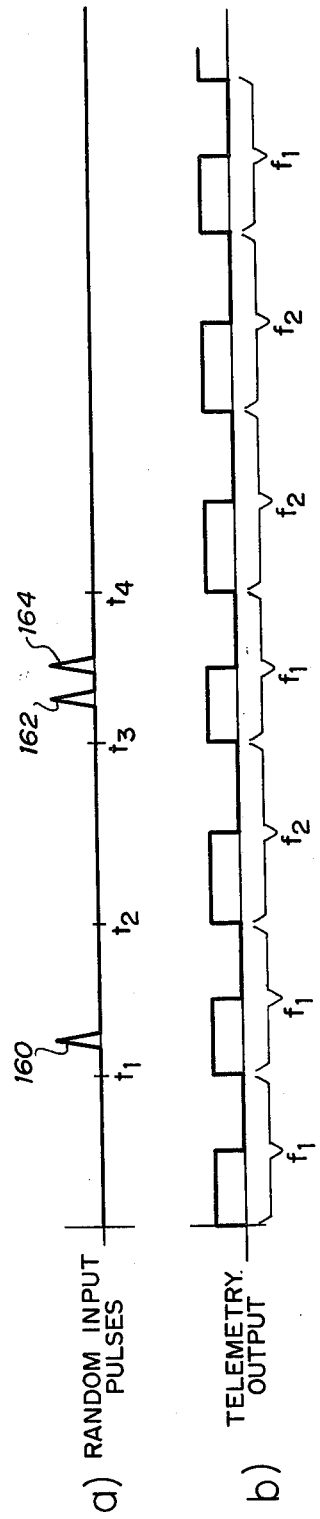
FIGS. 3a and 3b are waveforms illustrating the operation of the downhole telemetry system shown in FIG. 1.

FIG. 3 illustrates a typical operation of the circuitry shown in FIG. 1. FIG. 3a illustrates three asynchronous pulses generated from the counter 12. FIG. 3b illustrates the telemetry output from divider 100 in response to the three asynchronous pulses shown in FIG. 3a. During the time interval $0-t_1$ in FIG. 3a, no asynchronous pulses are input to the system, and thus the output of the divider 100 is a square wave having a frequency $f_1$, which in the preferred embodiment is 20Khz. During the time interval $t_1-t_2$, an asynchronous pulse 160 is input from the counter 12 to the flipflop 20. Again, during the time interval $t_1-t_2$, a square wave having a frequency $f_1$ is again generated from the divider 100, as the pulse 160 has not yet affected the waveform of FIG. 3b. However, during the time interval $t_2-t_3$, a square wave having an elongated period which corresponds to the frequency $f_2$, or in the preferred embodiment 18Khz is generated from the divider 100.

The cycle of the elongated waveform during the interval $t_2-t_3$ is generated due to the input of the pulse 160 into the system, for the reasons previously described. Specifically, the pulse 160 causes the clocking of the counter 38 down one count and causes the deletion of portions of the $\phi$B clock signal due to gating of gate 86 to reduce the frequency applied to the divider 100 to 180Khz. The divider 100 thus generates a square wave during the period $t_2-t_3$ having a period 10 percent longer than the period of the waveforms previously generated during the time interval $0-t_1-t_2$. This phase difference between the waveforms generated amounts to 36 electrical degrees.

No additional asynchronous pulses were input into the system during the time interval $t_2-t_3$, and thus during the next cycle of the divider 100, a square waveform having a period corresponding to frequency $f_1$ or 20Khz, is generated. During the time interval $t_3-t_4$, two asynchronous pulses 162 and 164 are input into the system. Thus, in the next two succeeding cycles of the output of divider 100, elongated square waves having periods corresponding with frequency $f_2$ are generated. Thereafter, the output of the divider returns to the period corresponding with the frequency $f_1$ as indicated in FIG. 3b.

In the preferred embodiment, a maximum of fifteen asynchronous pulses may be received by the present system in one time frame. Burst rates of asynchronous pulses of up to 200Khz may thus be accommodated by the present system, but the system can handle an average maximum of 20Khz asynchronous pulses.

In the case of a burst of asynchronous pulses during a single time frame, counter 38 is down counted one count for each input pulse. During the next 20Khz transition of the system, counter 38 is up counted one count. One pulse of each ten pulses is deleted from the input to counter 100, as the output of flipflop 48 remains high due to the high on its J gate. This high is one input to gate 94. At some point in time, enough up clocks will be given to counter 38 to return it to its zero state. The output of 44 will then go true and is an input to gate 50. The next 200Khz system clock applied to gate 50 will reset flipflop 48. This will remove the qualification line to gate 94 and thus the pulse deleting action to counter 100 will cease.

The counter 38 thus acts as a storage buffer that can receive a burst of input asynchronous pulses. If the system receives a burst rate of asynchronous pulses that exceeds the storage capacity of the counter 38, the counter 38 will downcount to a count of one and the output of gate 54 will go true. This output is inverted in invertor 60 and is applied to the J gate of the flipflop 20. Flipflop 20 will not thus receive anymore input asynchronous pulses until the counter 38 has up counted to at least a state of two. In the preferred embodiment, the counter 38 may store up to 15 counts.

A modulated square wave train is thus output from the divider 100 and into the modulator 26. The period of each cycle of the square wave train corresponds to input asynchronous pulses into the system, as previously described. The modulator shown in FIG. 2 receives the square wave input at terminal 110, and converts the square wave train into a triangular wave train. This reduces distortion and eliminates the requirement of high frequencies being transmitted up the logging cable. The modulated signal output by the modulator 26 comprises a triangular waveform having periods which correspond to the periods of the square wave train generated by the system shown in FIG. 1.

Figure 4:
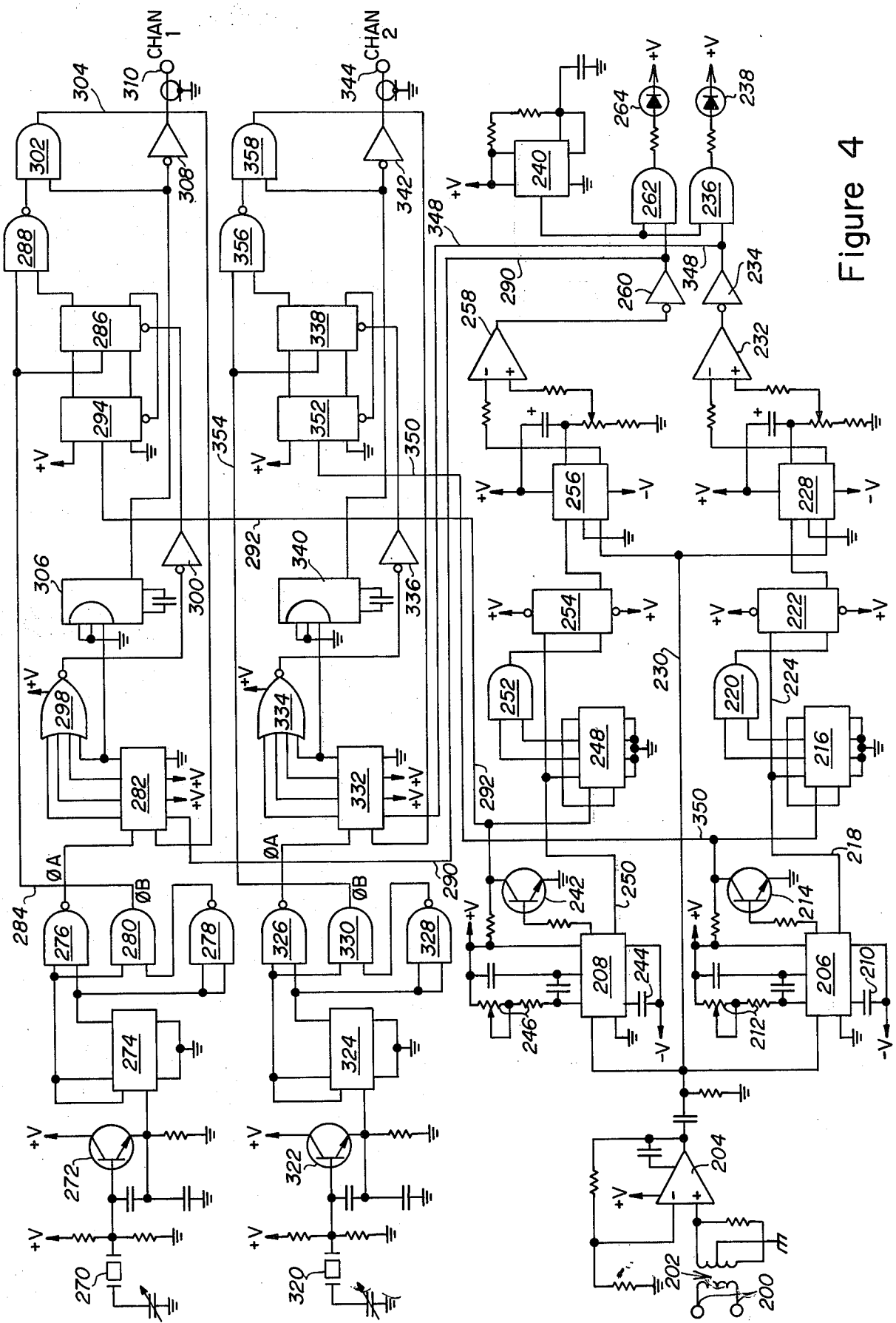
FIG. 4 is a schematic diagram of the uphole demodulation and detector circuitry of the invention.

FIG. 4 illustrates in detail the construction of the demodulator and detector system of the invention at the uphole location. The modulated triangular waveform transmitted up the logging cable is applied to terminal 200 of a transformer 202.

The secondary transformer 202 is connected to the input of an amplifier buffer 204. The output of amplifier buffer 204 is applied to inputs of two phase lock loops 206 and 208. For example, the loops 206 and 208 may comprise the LM565 phase lock loops manufactured and sold by the National Semiconductor Corporation. These phase lock loops can operate upon a triangular waveform of an amplitude of between 10MV to 3 volts.

The R-C network comprising capacitor 210 and resistors 212 comprises an R-C multiplier to multiply the input of the phase lock loop 206 by ten. The output frequency of the phase lock loop 206 is applied to the base of a buffer amplifier transistor 214. The collector output of transistor 214 is applied to a divide-by-ten divider 216. The 20Khz output of divider 216 is applied to via lead 218 to phase lock loop 206. The phase lock loop 206 thus operates as a typical synthesizer wherein a synthesized 200Khz signal is phase locked to a 20Khz input. As will be subsequently described in greater detail, the phase lock loop circuitry thus follows the input frequency changes of the incoming signal in order to detect modulated phase periods of the wave train generated by the downhole logging system.

Two divide-by-five outputs of the divider 216 are applied through the inputs of an AND gate 220. The output of the AND gate 220 is applied to a flipflop 222. Flipflop 222 is gated via lead 224 by the divider 216 and is clocked by the output of gate 220. The output of flipflop 222 is a waveform shifted by three-fifths of the clock cycle from the waveform supplied to phase lock loop 206 via the lead 218. This provides a waveform almost in phase quadrature which is used as an input to a phase detector 228. A second input to the phase detector 228 is applied from the output of amplifier 204 via lead 230. The phase detector 228 can comprise, for example, the LM565 phase detector. If phase coherence is detected between the two inputs to the phase detector 228, a maximum signal is developed between two outputs of the phase detector 228. The two outputs of the phase detector 228 are applied to the inputs of a comparator 232. The output of comparator 232 is applied through an invertor 234 to an AND gate 236 which holds an LED 238 in an energized illuminated state.

If the phase detector 228 does not detect phase coherence between the two input signals, then the outputs of the comparator 232 are at a minimum and the comparator 232 is thus not activated. The gate 236 then receives a clock signal from an oscillator 240 to alternately energize and deenergize the LED 238 to indicate that no lock has occurred.

The previously described circuitry is utilized for detection of the modulated channel 1. Channel 1 information generated from the amplifier 204 is detected by circuitry connected with the phase lock loop 208 which is identical to that previously described. The output of loop 208 is connected to the base of a transistor 242 and the input of loop 208 is multiplied by ten by an R-C network comprising capacitor 244 and resistance 246. The collector output of 242 is connected to divide-by-ten divider 248. An output of divider 248 is applied via lead 250 to the phase lock loop 208. Divide-by-five outputs of the divider 248 are applied at inputs of an AND gate 252, the output of which is applied to a flipflop 254. Flipflop 254 is clocked by an output from the divider 248. The output of the flipflop 254 is applied from an input of a phase detector 256. The second input of the phase detector 256 is the input signal applied on lead 230. The outputs of the detector 256 are applied through a comparator 258, the output of which is applied through an invertor 260 to an input of AND gate 262. The output of gate 262 controls an LED 264. Oscillator 240 is also connected to gate 262.

The circuitry for demodulating channel 1 information also includes an oscillator comprising a crystal 270 and a transistor 272 and associated circuitry. The resulting two megacycle signal is applied to divide-by-ten divider 274, the output of which is applied to NAND gates 276 and 278 and an AND gate 280. Gate 276 generates a $\phi A$ signal at a rate of 200Khz which is applied to the up input of an up/down counter 282. Gate 280 generates a $\phi B$ signal at a 200Khz rate which is applied via lead 284 to the flipflop 286 and a NAND gate 288. The phase lock indication signal is applied from the output of invertor 260 via lead 290 to the up/down counter 282. Without lock indication, counter 282 is not allowed to operate. 200Khz phase lock clock signals are applied from the collector of transistor 242 via lead 292 to a flipflop 294 asynchronously. The outputs of counter 282 are applied through NOR gate 298 and through an invertor 300 to the flipflop 296. The phase lock 200Khz clock signals are thus entered into the flipflop 286 and the gate 288 synchronously with the $\phi B$ clock signal applied via lead 284.

The counter 282 is utilized as a peak detector to detect jitter in the signal. The counter 282 normally resides at a count of six and is counted up by the 200Khz signal. The output of the NAND gate 288 is connected to an AND gate 302 which generates an output which is applied via lead 304 back to the counter 282, in order to count the counter 282 down when a 200Khz signal is received.

A one shot multivibrator 306 is connected to an output of a counter 282 and generates an output which is applied through an invertor 308 to a Channel 1 output terminal 310. Each time the modulated input signal drops from a 20Khz period to an 18Khz period, two $\phi A$ clock pulses are generated for each $\phi B$ clock pulse. The one shot multivibrator 306 then generates a pulse which is applied through invertor 308 to the terminal 310, such that an asynchronous pulse input at the downhole location is reconstructed.

The pulse that is applied to the invertor 308 is also applied to AND gate 302. This pulse is entered as a down count pulse via lead 304 to the up/down counter 282. This restores the up/down counter to its normal operating state, i.e. one down count pulse via lead 304 for each $\phi A$ up count pulse received from gate 276. The Channel 2 recapture circuitry is similar to that previously described. An oscillator comprises a crystal 320 and a transistor 322. The output of the oscillator is applied to a divide-by-ten divider 324 and the output of the divider is applied to two NAND gates 326 and 328 and to an AND gate 330. The output of the NAND gate 326 comprises a 333Khz $\phi A$ signal and the output of gate 330 comprises a 333Khz $\phi B$ signal. $\phi A$ signal is applied to the up input of an up/down counter 332, the outputs of which are connected through a NOR gate 334 and through an invertor 336 to the flipflop 338. The output of the counter 332 is also applied to a one shot multivibrator 340, the output of which is applied through an invertor 342 to the Channel 2 output terminal 344. The output of the invertor 234 is applied via a lead 348 through the counter 332. Further, the phase lock clock signal generated from the collector output of transistor 214 is applied via lead 350 to a flipflop 352 which is interconnected with flipflop 338. The $\phi B$ signal generated from gate 330 is applied via lead 354 to an input of a NAND gate 356. The output of gate 356 is applied to an AND gate 358, the output of which is applied back to the counter 332.

The operation of the system will be described with respect to Channel 1, as both Channels 1 and 2 are constructed and operate in identical manners, except for the fact that the second Channel utilizes a higher carrier frequency. Assuming that a 20Khz waveform is input to the system shown in FIG. 4, thereby indicating that no asynchronous pulses have been input in that time period at the downhole location, the counter 282 receives a 200Khz signal from gate 276. The flipflop 294 receives 200Khz clock pulses asynchronously from transistor 242 via lead 292. The flipflop 294 and 286 thus operate as asynchronous-to-synchronous converters. Gate 302 provides $\phi B$ clock pulses at a 200Khz rate to counter 282, in order to down count the counter. Thus 200Khz $\phi A$ clock signal is applied to counter 282 and the 200Khz $\phi B$ signal is also applied to the counter 282. The counter thus toggles between state 6 and state 7. No signal is generated by the one shot multivibrator 306 and thus no indication of an asynchronous input pulse provided at the output terminal 310.

When the signal input to the transformer 202 has a period corresponding with an 18Khz signal, thus indicating the generation of an asynchronous pulse at the downhole location during the preceeding cycle, the change in period is immediately detected by the phase lock loop 208. The transistor 242 thus changes frequency from 200Khz to 180Khz. The resulting 180Khz asynchronous pulses are entered into flipflop 294 and 286. These pulses are applied to gate 288 and the net output of gate 288 is 180Khz. These pulses are applied through gate 302 and are applied via lead 304 to the up/down counter 282 as down count pulses. The output of the counter 282 is thus toggled true at a 20Khz rate and the one shot multivibrator 306 is operated to generate signals via the invertor 308 representative of the number of input asynchronous pulses input at the downhole location. For example, if the maximum number of 20Khz asynchronous pulses have been input at the downhole location, the one shot multivibrator 306 is operated at a 20Khz rate in order to provide output signal at the terminal 310.

One of the aspects of the present invention is that periods of the downhole wave train are elongated by 36° in response to an asynchronous input pulse. This elongated signal is multiplied by ten by the phase lock 208, and thus the phase shift is increased to 360°, thereby facilitating the phase shift detection by the invention. In other embodiments, it may be desirable to provide only a 3.6° phase shift between the signals and then multiply the phase shift by 100, for example. In such an embodiment, only one pulse out of 100 would be deleted at the downhole station in accordance with the invention.

The phase lock loop of the invention is important in that it can instantaneously change frequency without any overshoot. The phase lock loops thus enable the multiplication of the input of the phase shift by a desired magnitude in order to increase the phase differences within the modulated waveform to 360°. With the utilization of the multiplication and phase lock loop system of the invention, the carrier frequency utilized to transmit through the logging cable is able to carry more information than prior art devices, without loss of resolution due to pulse smearing and the like because of phase shifts produced during transmission.

Whereas the present invention has been described with respect to a well logging environment, it will be understood that the present technique can also be utilized for other environments wherein transmission of data over long lines is desired, but wherein the lines are subject to large amplitude degradation and generally undetermined phase shift characteristics. For example, this system cound be advantageously utilized for pulse transmission through overseas cables and the like.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for pulse transmission comprising:
   means for receiving asynchronous input pulses,
   means for generating a periodic wave train having a first frequency,
   means for gating said wave train in response to said input pulses for deleting portions of said wave train,
   means for dividing said wave train wherein the period of one cycle of said wave train is elongated in response to the reception of each asynchronous input pulse,
   means for transmitting said divided wave train to a remote location, and
   means at said remote location for reconstructing representations of said input pulses in response to said first and second frequencies in said wave train.

2. The system of claim 1 and further comprising:
   means for converting said wave train into a triangular wave train prior to transmission to said remote location.

3. The system of claim 1 and further comprising:
   phase lock loop means at said remote location for detecting changes in frequency of said wave train.

4. The system of claim 3 and further comprising:
   means for multiplying said wave train prior to input into said phase lock loop means.

5. A system for transmitting randomized pulses from a downhole well logging device through a cable to an uphole station comprising:
   means for being positioned downhole for receiving said randomized pulses,
   a clock for generating a clock signal having a fixed first frequency,
   gate means connected to the output of said clock for selectively gating said clock signal,
   means responsive to the reception of one of said randomized pulses for operating said gate means for a prescribed interval to prevent the passage of a predetermined portion of said clock signal,
   means for dividing the output of said gate means to generate a series of pulses having periods representative of the reception of said randomized pulses, wherein one cycle of said series of pulses is elongated in response to the reception of each of said randomized pulses,
   means for transmitting said series of pulses through said cable, and
   means located uphole for reconstructing representations of said randomized pulses in response to said series of pulses.

6. The system of claim 5 and further comprising:

means for multiplying said series of pulses at the uphole location in order that the phase difference between portions of said series is 360°.

7. The system of claim 5 wherein said receiving means comprises a counter for buffering said randomized pulses and for generating signals for operating said gate means.

8. The system of claim 5 and further comprising:
means for modulating said series of pulses prior to transmission through said cable.

9. A system for transmitting randomized pulses from a downhole well logging device through a cable to an uphole station comprising:
means for being positioned downhole for receiving said randomized pulses,
a clock for generating a clock signal having a fixed first frequency,
gate means connected to the output of said clock for selectively gating said clock signal,
means responsive to the reception of one of said randomized pulses for operating said gate means for a prescribed interval to prevent the passage of a predetermined portion of said clock signal,
means for dividing the output of said gate means to generate a series of pulses having periods representative of the reception of said randomized pulses,
means for transmitting said series of pulses through said cable to an uphole location,
means at said uphole location for multiplying said series of pulses,
phase lock loop means for receiving said multiplied series of pulses,
clock means for generating a second clock signal,
asynchronous-to-synchronous convertor means for receiving said clock signal and the output of said phase lock loop means, and
counter means responsive to the output of said converter means for generating representations of said randomized pulses.

10. The system of claim 9 and further comprising:
phase detection means responsive to the output of said phase lock loop means and to said series of pulses, and
comparator means responsive to the output of said phase detection means.

11. A system for transmitting randomized pluses comprising:
means for receiving said randomized pulses,
a clock for generating a periodic pulse train having a first frequency,
means responsive to the reception of said randomized pulses for extending the periods of cycles of said periodic pulse train and to provide a series of pulses representative of the reception of said randomized pulses, the extended cycles being out of phase with said periodic pulse train by a predetermined magnitude,
means for transmitting said series of pulses to a remote location,
means for multiplying said series of pulses by a magnitude sufficient that said extended cycles are out of phase with the remainder of said series of pulses by 360°, and
means for generating representations of said randomized pulses in response to the output of said multiplying means.

12. The system of claim 11 and further comprising:
counter means for storing said randomized pulses prior to extension of the periods of cycles of said pulse train.

13. The system of claim 12 and further comprising:
gate means responsive to the output of said counter means for deleting portions of said periodic pulse train.

14. The system of claim 13 and further comprising:
divider means for dividing said pulse train.

15. The system of claim 11 wherein said means for generating representations comprises:
phase lock loop means.

16. The method of transmitting randomized pulses from a downhole well logging device through a cable to an uphole station comprising:
receiving said randomized pulses at a downhole location,
generating periodic clock pulses,
gating said clock pulses in response to reception of said randomized pulses to delete ones of said clock pulses,
dividing said gated clock pulses to generate a series of pulses having periods representative of the reception of said randomized pulses,
transmitting said series of pulses to an uphole location, and
reconstructing at said uphole location representations of said randomized pulses from said series of pulses.

* * * * *